United States Patent
Wakefield, II (10) Patent No.: US 7,171,288 B2
(45) Date of Patent: Jan. 30, 2007

(54) METHOD AND APPARATUS FOR REPROGRAMMING A PROGRAMMED CONTROLLER OF A POWER DRIVEN WHEELCHAIR

(75) Inventor: Theodore D. Wakefield, II, Vermillion, OH (US)

(73) Assignee: Invacare Corporation, Elyria, OH (US)

( * ) Notice: Subject to any disclaimer, the term of this patent is extended or adjusted under 35 U.S.C. 154(b) by 269 days.

(21) Appl. No.: 10/679,994

(22) Filed: Oct. 6, 2003

(65) Prior Publication Data

US 2005/0075758 A1    Apr. 7, 2005

(51) Int. Cl.
G06F 17/00 (2006.01)
(52) U.S. Cl. .......................................................... 701/1
(58) Field of Classification Search ...................... 701/1
See application file for complete search history.

(56) References Cited

U.S. PATENT DOCUMENTS

| | | | |
|---|---|---|---|
| 5,047,953 A | | 9/1991 | Smallwood et al. |
| 5,113,481 A | * | 5/1992 | Smallwood et al. ........ 704/271 |
| 5,712,969 A | * | 1/1998 | Zimmermann et al. ........ 714/5 |
| 2004/0187035 A1 | * | 9/2004 | Schwan et al. ............. 713/202 |

FOREIGN PATENT DOCUMENTS

DE    WO-03001348    *    1/2003

OTHER PUBLICATIONS

International Search Report and Written Opinion, International Application No. PCT/US2004/030394, 12 pages.

* cited by examiner

Primary Examiner—Thu V. Nguyen
(74) Attorney, Agent, or Firm—Calfee, Halter & Griswold, LLP (57) ABSTRACT

Apparatus for reprogramming a programmed controller of a power driven wheelchair comprises: a reprogrammable, non-volatile memory programmed with a plurality of programs executable by the controller to operate the wheelchair, the non-volatile memory disposed at the wheelchair and coupled to the wheelchair controller; a general-purpose computer programmed to reprogram the non-volatile memory while disposed at the wheelchair, the programmed computer for storing main programs for use in reprogramming the non-volatile memory, the programmed computer being coupleable to the wheelchair controller for accommodating an exchange of data therebetween; and wherein the wheelchair controller being operative to communicate with the programmed computer to reprogram the non-volatile memory with the main programs while the non-volatile memory is disposed at the wheelchair. Methods for reprogramming the non-volatile memory are also disclosed.

20 Claims, 6 Drawing Sheets

Fig. 1
(BACKGROUND)

METHOD AND APPARATUS FOR REPROGRAMMING A PROGRAMMED CONTROLLER OF A POWER DRIVEN WHEELCHAIR

BACKGROUND OF THE INVENTION

The present invention is directed to the field of power driven wheelchairs, in general, and more particularly, to a method and apparatus for reprogramming a programmed controller of a power driven wheelchair.

Figure 1:
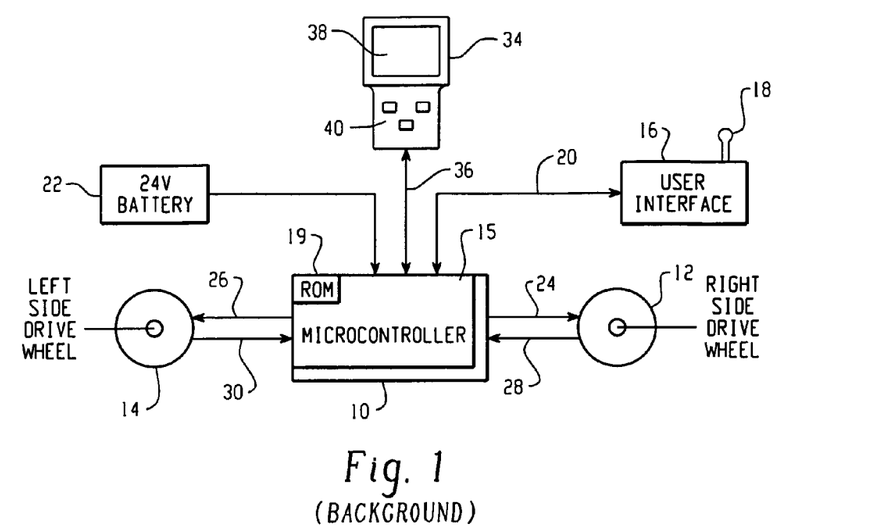
FIG. 1 is a block diagram schematic of an exemplary motor drive arrangement of a power driven wheelchair including a programmed microcontroller.

Power driven wheelchairs which may be of the type manufactured by Invacare Corporation of Elyria, Ohio, for example, generally include right and left side drive wheels driven by a motor controller via respectively corresponding right and left side drive motors, all of which being disposed on the wheelchair. An exemplary illustration of such a motor drive arrangement is shown in the schematic of FIG. 1. Referring to FIG. 1, a motor drive controller 10 which may be an Invacare MK IV™ controller, for example, controls drive motors 12 and 14 which are mechanically linked respectively to the right side and left side drive wheels of the wheelchair. The controller 10 includes a microcontroller 15 which may be programmed with a plurality of drive programs, each suited for a particular operating environment of the wheelchair.

A user interface 16 which may include a joystick 18 and selection switches (not shown) operable by a user is also disposed on the wheelchair in a convenient location to the user. The user interface 16 is generally interfaced to the microcontroller 15 over a two wire serial coupling 20 to permit the user to select a drive program appropriate for operating the wheelchair in its environment and to adjust the direction and speed of the wheelchair within the selected drive program. In the present example, a main program of the microcontroller 15 which may contain the plurality of drive programs is stored in a non-volatile memory 19, like a read only memory (ROM), for example, which may be integrated into the microcontroller 15 or may be a separate component thereof.

The motor controller 10 is generally powered by a battery source 22, which may be 24 volts, for example, also disposed on the wheelchair. The drive motors 12 and 14 may be of the permanent magnet type and may be either a gearless, brushless AC motor or a brush type DC motor. The microcontroller 15 is interfaced and responsive to the user interface 16 to control drive signals 24 and 26 to motors 12 and 14, respectively, via a power switching arrangement configured in accordance with the motor type being driven. The power switching arrangement may be powered by the 24V battery 22. Thus, as the user adjusts the speed and direction of the wheelchair via the joystick of interface 16, appropriate drive signals 24 and 26 are controlled by motor controller 10 via microcontroller 15 to drive the motors 12 and 14 accordingly.

Motor controller 10 generally controls motor speed to the user setting utilizing a closed loop controller programmed in the microcontroller 15. Actual speed of each motor 12 and 14 may be derived from signals 28 and 30 respectively sensed therefrom. For example, for AC motors, a Hall Effect sensor may be disposed at the motor for sensing and generating a signal representative of angular position. The signals 28 and 30 are coupled to the microcontroller 15 which may be programmed to derive motor speed from a change in angular position for use as the actual speed feedback signal for the closed loop speed control of the motor. For DC motors, the voltage Va across the armature and armature current Ia may be sensed from each motor 12 and 14 and provided to the microcontroller 15 via lines 28 and 30, respectively. Microcontroller 15 may under programmed control derive the actual speed of each motor 12 and 14 from the respective voltage Va and current Ia measurements thereof for use as the speed feedback signal for the respective closed loop speed control of each motor 12 and 14.

In addition, interaction with the motor controller 10 is performed through a remote programmer 34 which may be electrically coupled to a port of the microcontroller 15 via signal lines 36, for example. Each remote programmer 34 may include a screen 38 for displaying interactive text and graphics and a plurality of pushbuttons 40 for communicating with the microcontroller 15 which is programmed to interact with the programmer 34. A dealer is generally provided with one or more remote programmers for rendering the wheelchair unique to the user's safe operating capabilities.

From time to time, the non-volatile ROM 19 may have to be reprogrammed and/or updated to more recent program versions which may be accomplished either in the field or at the factory or a service center. In some motor controllers, the programmed ROM 19 may be embodied in an integrated circuit or chip, either as part of the microcontroller 15 or separate therefrom. In these cases, the chip containing the programmed ROM 19 is removably disposed in a socket of a printed circuit (PC) card of the motor controller assembly 10. If the ROM 19 has to be reprogrammed or updated, the chip is removed from the socket and sent to the factory or authorized service center for processing. This renders the wheelchair out of service for an undesirable period of time.

Alternatively, some wheelchair dealerships are equipped with specialized converters and programming devices which permit reprogramming or updating of programs of the ROM 19 on the PC card. Generally, this process is not performed by a lay person, but rather performed by a skilled technician employed by the dealership. In these instances, the cost of the specialized equipment and skilled technician is borne by the dealership.

The dealers would prefer servicing the wheelchair themselves without having to send components back to the factory or service centers for reprogramming and/or updating of operational programs. However, the expense of the specialized equipment and employment of a skilled technician for performing this service is quite onerous to the dealer. Accordingly, it is desirable to simplify the process of reprogramming and/or updating the operational programs of the wheelchair at least to the point where it may be performed by a lay person. The present invention satisfies this desire.

SUMMARY OF THE INVENTION

In accordance with one aspect of the present invention, apparatus for reprogramming a programmed controller of a power driven wheelchair comprises: a reprogrammable, non-volatile memory programmed with a plurality of programs executable by the controller to operate the wheelchair, the non-volatile memory disposed at the wheelchair and coupled to the wheelchair controller; a general-purpose computer programmed to reprogram the non-volatile memory while disposed at the wheelchair, the programmed computer for storing main programs for use in reprogramming the non-volatile memory; means for coupling the programmed computer to the wheelchair controller for accommodating an exchange of data therebetween; and wherein the wheelchair controller being operative to communicate with the programmed computer through the coupling means to reprogram the non-volatile memory with the main programs while the non-volatile memory is disposed at the wheelchair.

In accordance with another aspect of the present invention, a method of reprogramming a programmed controller of a power driven wheelchair comprises the steps of: coupling a reprogrammable, non-volatile memory programmed with a plurality of programs to the wheelchair controller; determining if the plurality of programs of the non-volatile memory are to be reprogrammed; coupling a programmed computer to the wheelchair controller based on the result of the determining step, the computer being programmed to reprogram the non-volatile memory through the wheelchair controller; displaying an interactive programming screen image on a display of the programmed computer; and interacting with the programming screen image to control reprogramming the non-volatile memory through the wheelchair controller.

In accordance with yet another aspect of the present invention, a method of reprogramming a programmed controller of a power driven wheelchair comprises the steps of: partitioning a reprogrammable, non-volatile memory into at least two sections; programming one section of the non-volatile memory with a boot program executable by the wheelchair controller; programming another section of the non-volatile memory with main programs executable by the wheelchair controller to operate the wheelchair; executing the boot program by the wheelchair controller to determine if the main programs of the non-volatile memory are to be reprogrammed; coupling a programming device to the wheelchair controller based on the result of the determination; and interacting with the programming device to control a reprogramming of the main programs of the non-volatile memory through the wheelchair controller.

DETAILED DESCRIPTION OF THE INVENTION

Figure 2:
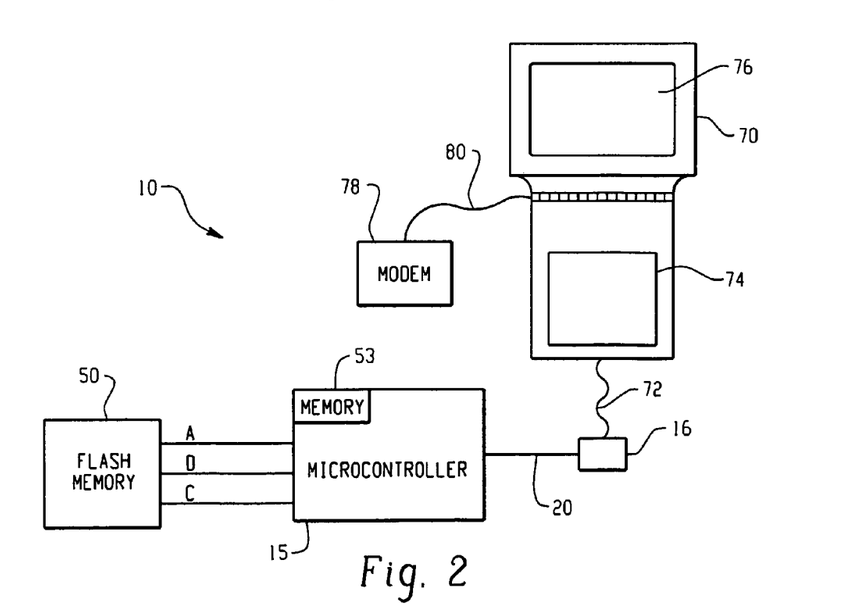
FIG. 2 is a block diagram schematic of apparatus for reprogramming the microcontroller suitable for embodying the principles of the present invention.

FIG. 2 is a block diagram schematic of reprogramming apparatus suitable for embodying the principles of the present invention. Referring to FIG. 2, a reprogrammable non-volatile memory 50 which may be a programmable system device (PSD) or flash memory, for example, is coupled to the microcontroller 15 via address (A), data (D) and control (C) lines thereof. The flash memory 50 may be integrated within the integrated circuit or chip of the microcontroller 15 or contained on a separate chip which may be of the type manufactured by ST Microelectronics under the model no. PSD913F2, for example. The flash memory 50 is initially programmed at the factory.

The flash memory 50 may be reprogrammed in the field while soldered in place on the PC board of the microcontroller 15. Thus, no special connector or programming device is needed. The flash memory 50 may be reprogrammed using a similar process to reprogramming an electrically erasable programmable read only memory (EEPROM), except that the flash memory may be reprogrammed at a much faster rate. For example, an EEPROM is generally reprogrammed at a rate of about one byte of memory per ten milliseconds. Thus, for tens of thousands of bytes of memory, reprogramming of an EEPROM takes a very long time. However, the flash memory 50 may be reprogrammed at a rate of approximately one byte per thirty microseconds or approximately thirty-two bytes per one millisecond, thereby shortening the reprogramming period by orders of magnitudes as will become more evident from the description herein below.

Figure 4:
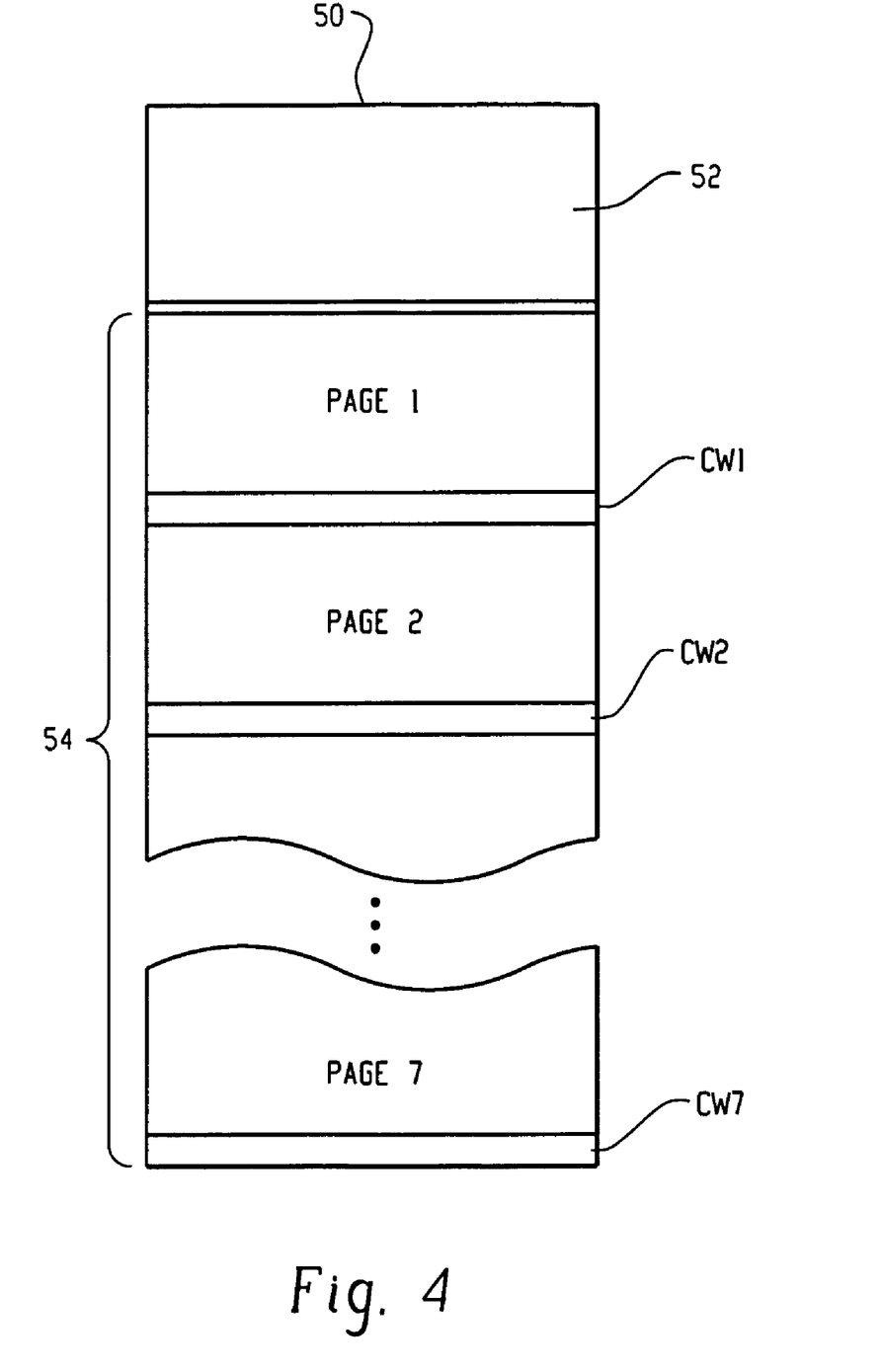
FIG. 4 is a block diagram schematic of a sectioned non-volatile flash memory suitable for use in the embodiment of FIG. 2.

The flash memory 50 may be partitioned into two memory sections as shown in the illustration of FIG. 4. One section 52 of memory 50 stores a first or boot program, and the other section 54 stores a second or main program which comprises the drive and application programs for operating the wheelchair. The memory registers of the main program 54 may be sectioned into a plurality of pages with each page containing thousands of registers, each for containing a byte of data. For example, the main program may be sectioned into 7 pages of registers as shown in FIG. 4 with each page containing sixteen thousand byte registers, each byte register including eight bits. Coded words may be stored in predetermined registers of the main program section for use in determining if the main program is complete and acceptable for execution by the microcontroller 15.

In the present embodiment, a coded word is stored in the last byte register of each page of the main program as a signature byte for analysis. Thus, the byte registers of the non-volatile flash memory 50 may be programmed a page at a time with the signature coded word programmed in the last byte register for each page. Accordingly, if a properly coded word is found in the last byte register of a page in the flash memory, then it is presumed that all of the preceding byte registers were programmed properly. It is understood that signature coded words may be programmed into other byte registers of memory 50 without deviating from the broad principles of the present invention.

In an alternate embodiment, a coded word representative of a check sum value of all of the registers of the main program section may be loaded into one or more predetermined byte registers of the main program. Accordingly, the microcontroller 15 may execute the boot program to add up all of the values of the byte register contents of the main program section and compare the total value with the check sum value in the predetermined byte registers. In this alternate embodiment, the check sum value is intended to cover all of the main program registers, but it is understood that the main program section may be broken down into subsections or pages just as well. In which case, a coded word representative of a check sum value for each page may be loaded into a predetermined register or registers of the page, for example. Thus, execution of the boot program would result in adding up the values of the byte register contents of each page and comparing each total value with the corresponding check sum value of each page to determine if the main program is complete.

In yet another embodiment, the coded word may be representative of a cyclic redundancy check (CRC) value. In this embodiment, the boot program may include an algorithm for performing a CRC of the registers of the main program which results in a rather unique value which may be compared to the CRC coded word contained in the predetermined registers of the main program section. Similarly, the main program section may be broken down into subsections or pages just as well. In which case, a coded word representative of a CRC value for each page may be loaded into a predetermined register or registers of each page, correspondingly. Thus, execution of the boot program would result in performing the CRC algorithm on the byte register contents of each page and comparing each calculated CRC value with the corresponding CRC value of each page to determine if the main program is complete.

In the present embodiment, upon power-up of the microcontroller 15, program execution starts in the boot program of section 52, a description of which being provided herein below in connection with the exemplary flow chart of FIG. 5. During execution of the boot program, the microcontroller 15 accesses the data of predetermined registers from the main program section of memory 50, which may be the last byte registers of the pages, for example, and determines if the accessed registers contain the respective proper code words CW1, CW2, . . . , CW7. If any of the accessed registers does not contain the proper code word, which may be all zeros, for example, then, the microcontroller 15 presumes that the main program has been loaded into the flash memory improperly and shuts down, i.e. does not permit execution of the main program. Otherwise, program execution diverts to the main program for proper operation of the wheelchair. Some or all of the main program may be stored in a temporary memory 53 which may be integrated into the microcontroller 15.

Figure 3:
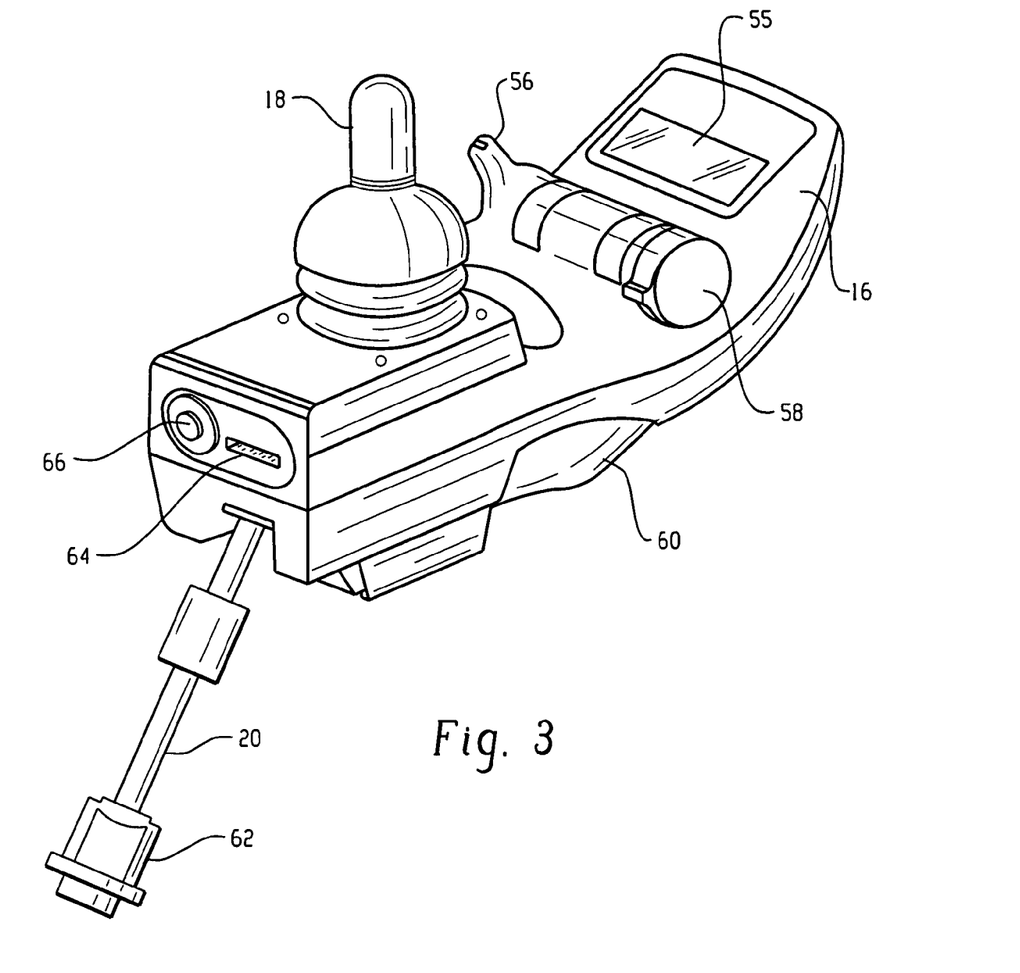
FIG. 3 is an illustration of an exemplary joy stick unit suitable for use in the embodiment of FIG. 2.

In the present embodiment, when the boot program shuts down, it enters into a wait loop waiting for commands to reprogram the non-volatile flash memory 50. These reprogramming commands may be directed to the microcontroller 15 through the user interface 16 which may be a joy stick unit, for example. An exemplary joy stick unit 16 suitable for use in the embodiment of FIG. 2 is shown in FIG. 3. Referring to FIG. 3, the unit 16 includes the joy stick 18 and further comprises a liquid crystal display (LCD) 55, a drive select on/off switch 56, a speed control 58, a charger/programming port 60, the serial communication cable 20 having a connector 62 at one end, an optional drive select port 64, and a remote on/off port 66. When the boot program is in the wait loop, nothing will be displayed on the LCD 55 of the joy stick unit 16 which is an indication that reprogramming of the flash memory 50 is needed.

To initiate the reprogramming process of the flash memory 50, a programming device, like a general purpose personal computer (PC) 70, for example, may be connected to the microcontroller 15. Since the microcontroller 15 is already programmed to interface with the user interface 16, i.e. to receive and respond to commands therefrom as described herein above in connection with the embodiment of FIG. 1, it is convenient to couple the PC 70 to the microcontroller 15 through the user interface 16. For this purpose, a serial communication cable 72 may connect a serial port of the PC 70 to the charger/programming port 60 of the unit 16. The PC 70 may be a lap top unit, for example, having a key board 74 and a display screen 76, and programmed to reprogram the flash memory 50 through the microcontroller 15. The PC 70 may be loaded with the appropriate main program for the flash memory 50 based on the product code and/or version code of the motor controller of the wheel chair. The loading of this main program file into the PC 70 may be accomplished through a number of different ways, including downloading the main program file from a compact disk memory or a memory diskette supplied from the manufacturer, for example.

The appropriate main program file may even be downloaded from the manufacturer's website utilizing a communication connection through a modem 78 which may be coupled externally to the PC 70 over a cable 80 or be integrated into the PC 70. More specifically, the dealer may connect to the manufacturer's website via the modem 78 and, interacting through screen 76 and keyboard 74, enter the product code and/or version code for the most recent version of the main program for the flash memory 50. Through an interactive process with the PC 70, either over the web or through a compact disk or diskette memory, the dealer may select, download and communicate the downloaded main program to the microcontroller 15 which stores the received main program into a memory file of temporary memory 53, for example, for use in reprogramming the main program registers of the flash memory 50. An exemplary display screen suitable for use in reprogramming the flash memory 50 will be described herein below in connection with the illustration of FIG. 6.

In addition, there may be times when the dealer desires to update the main program code of the flash memory 50 to a more recent version. For this purpose, during execution of the main program 54, a polling of the programming port 60 of the user interface unit 16 is performed by the microcontroller 15 to determine whether or not a command is present to update the program stored in the flash memory 50. For example, the PC 70 may be connected to the user interface 16 via cable 72 and may issue a program update command to the microcontroller 15 through the user interface 16. When the microcontroller 15 receives a command to either reprogram or update the program code of the flash memory 50, it directs program execution to an erase and loading program which may be in the boot section of the flash memory 50.

Figure 6:
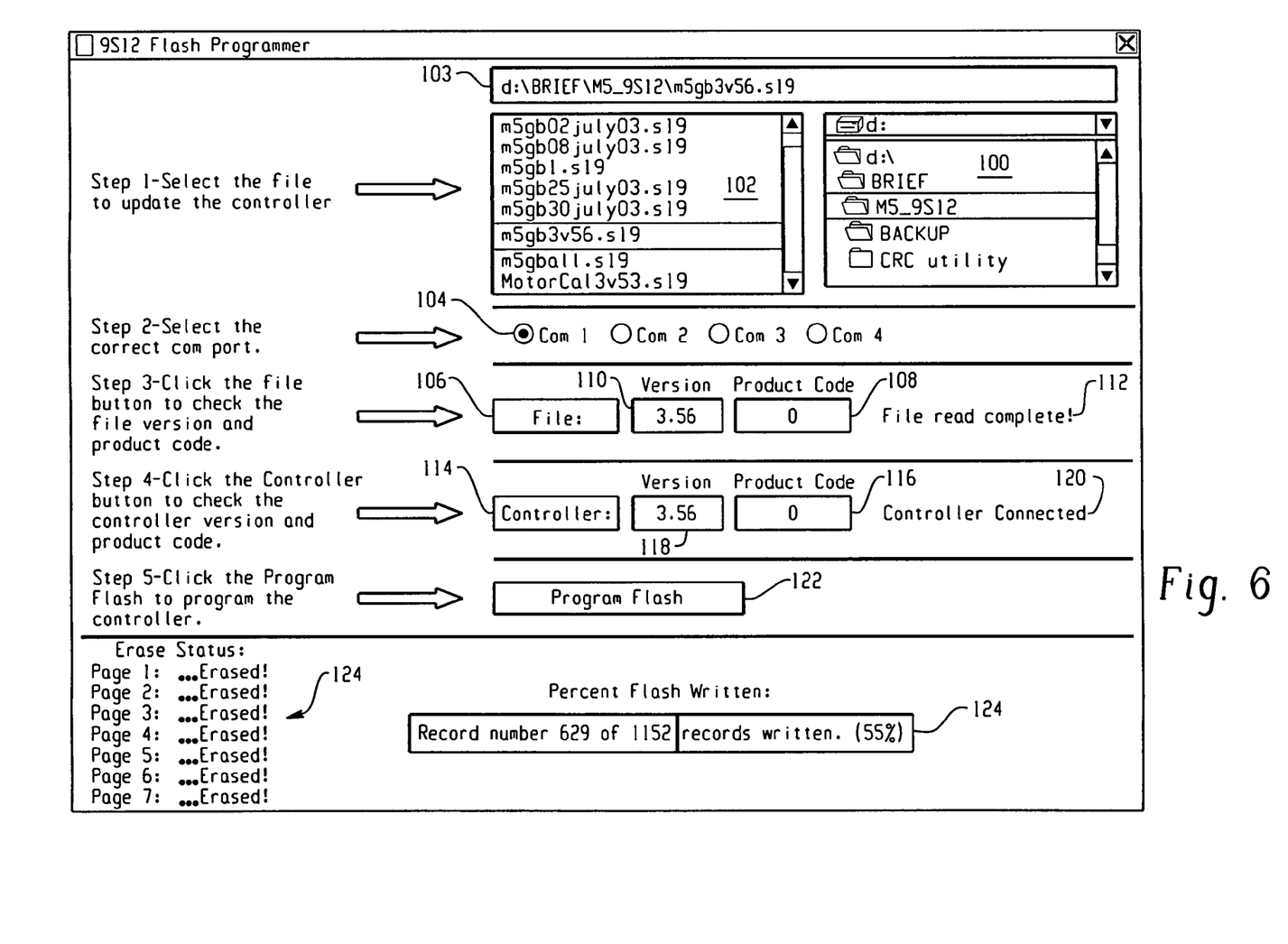
FIG. 6 is an illustration of an exemplary interactive screen image of a personal computer suitable for use in reprogramming the flash memory of FIG. 4.

Thus, to reprogram or update the programs of the flash memory 50, an individual may connect the PC 70 to the programming port 60 of the joy stick unit 16 utilizing the serial communication cable 72 and then enter into a flash memory programming program which is installed on the PC 70. Upon entering the flash memory programming program, proper programming commands are communicated to the microcontroller 15 which responds by entering into the erase and loading program of the boot programs. An interactive image display will also appear on the display screen 76 to aid the individual in programming the flash memory 50. An example of an interactive display screen for programming is shown in FIG. 6. Note that the individual need only follow the steps of the interactive screen image. Selections through the screen display may be performed by movement of a cursor to the proper position on the screen and depression of a key or activation device, for example.

For example, if the program file is being downloaded from a memory device inserted into a d:\controller of the PC 70, then the individual may select the proper file from a window 100 as exemplified by the highlighted file "MS5_9S12". Upon selection, all of the programs of the file MS5_9S12 are displayed for selection in a window 102. The individual may then select the proper main program from the window 102 as exemplified by the highlighted program "m5gb3v56.s19". Note that the selected program is also shown in window 103. In step 2, the individual may select the proper COM port for communicating with the microcontroller 15. In the present example, COM port 1 is selected as exemplified by the dot displayed in the circle 104.

In step 3, the individual may select the "File" window 106, and in response the PC 70 will display in windows 108 and 110 the product code and version, respectively, of the selected main program "m5gb3v56.s19". In step 3, the PC 70 will also display text at position 112 to verify that the main program file has been read in from the memory device and stored into the memory of the PC 70. Then, in step 4, the individual may select the "Controller" window 114, and in response the PC 70 will communicate with the microcontroller 15 via user interface 16 to read in the product code and version of the main program currently existing in the flash memory 50. This information is then displayed in windows 116 and 118, respectively. In step 4, the PC 70 will also display text at position 120 to indicate that it has successfully connected to the microcontroller 15 and is ready for programming the flash memory 50 with the selected program file. Note that if the product and version codes are the same for both the selected and current main programs, then no updating may be needed. Also, if the product code does not match or the file is an earlier version, updating may be prevented.

In step 5, the individual may select "Program Flash" at window 122 to initiate the programming of the flash memory with the selected main program file. During the initial steps of the programming process, the registers of each of the seven pages of the flash memory main program are erased via the erasing and loading program executed by the microcontroller 15 and the status of erasure of the seven pages is determined by the PC 70 and displayed at position 124 on the interactive screen. Then, as the main program of the flash memory 50 is programmed, the status of the programming is determined and displayed in a window 124. This status may be displayed both as a thermometer bar as shown and through text of how many records of the total records have been written into the main program section 54 of the flash memory 50. A percentage of memory programmed may also be displayed in text in window 124.

Thus, the exemplary screen image of FIG. 6 will indicate to the individual through window 124 when programming is complete. In the present embodiment, the baud rate for communicating the selected main program to the memory 53 of the microcontroller 15 for programming is on the order of 9600 baud. Accordingly, at eight bits per byte, the programming of the flash memory 50 at this rate will be approximately three and a half minutes. Of course, at a higher communication baud rate, the programming time will be reduced. Thus, the programming time is only limited by the rate at which the flash memory 50 may be programmed which is on the order of a byte per thirty microseconds, for example.

When programming of the flash memory 50 with the selected main program file is completed, then the boot program may be re-executed by the microcontroller 15 to check if the signature coded words were properly loaded into the last byte registers of each page of the main program section 54. If all of the signature coded words are proper, then execution is diverted to the main program for operation of the wheelchair. Otherwise, the boot program will again enter into the wait loop and wait for reprogramming instructions.

Figure 5A:
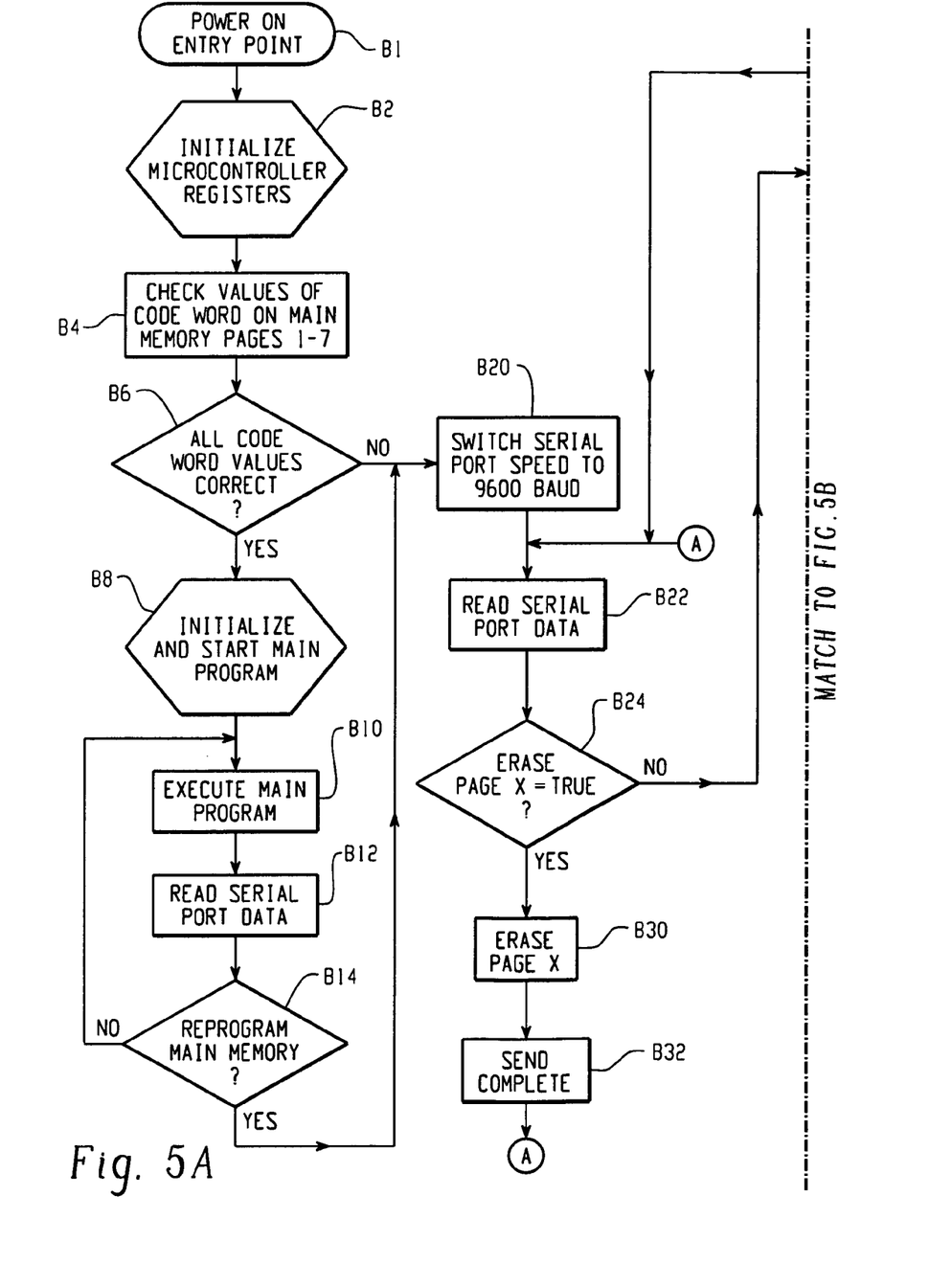
FIGS. 5A and 5B (collectively FIG. 5) depict a flow chart of an exemplary boot program suitable for being programmed in a section of the non-volatile flash memory of FIG. 4.
Figure 5B:
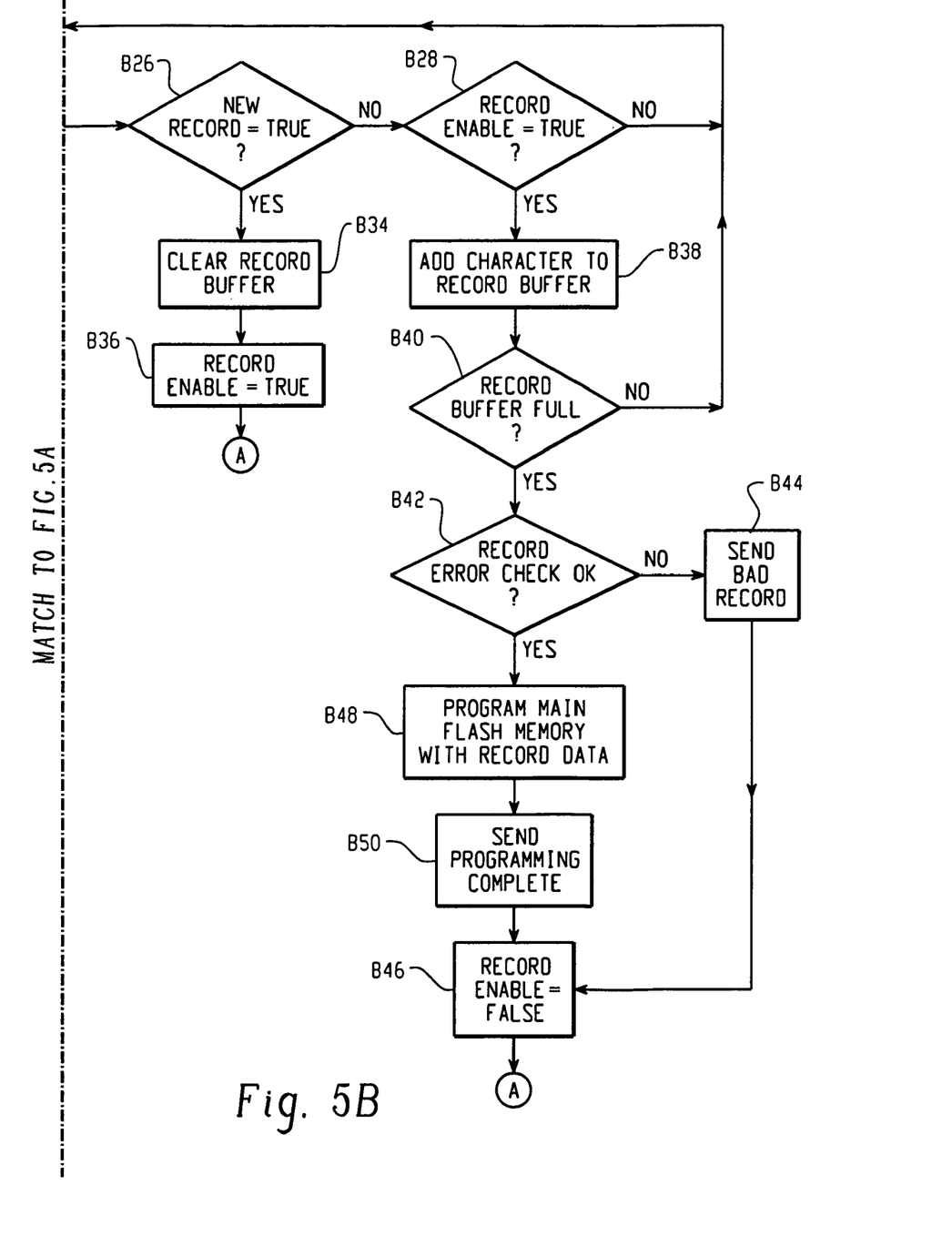

A flowchart of an exemplary boot program suitable for use in the embodiment described in connection with FIG. 2 is depicted in FIG. 5. Referring to FIGS. 5, as the microcontroller 15 is powered up, the exemplary boot program starts execution at block B1. In the successive block B2, the boot program initializes certain of the microcontroller registers to configure or set up the microcontroller 15 for a particular application. In block B4, the boot program accesses the contents from the last byte registers of the seven pages of the main program loaded in the flash memory 50 (see FIG. 4). In decision block B6, the accessed word of each page is compared with its respective code word CW1–CW7, and if all of the accessed words are correct, program execution is continued at block B8 wherein the main program is initialized and started.

During the execution of the main program as represented by block B10, the serial port of the microcontroller 15 into which the serial cable 20 is coupled is polled or monitored for programming commands. If data is determined to be present at the serial port, then in block B12, the data is read into the microcontroller 15 and analyzed in block B14. If in block B14, it is determined that the data is a command from the PC 70 to update or reprogram the main program of the flash memory 50, then program execution is diverted to the erase and load program of the boot programs starting at block B20. Otherwise, program execution continues in the main program of block B10. The erase and load program is also initiated at block B20 if it is determined in block B6 that any of the accessed words from the pages of the main program in the flash memory 50 is mismatched with its respective code word CW1–CW7.

In the boot programs, the erase and load program starts at block 20 wherein the receive baud rate of the serial port of the microcontroller 15 is increased to 9600 baud, for example. Thereafter, in block B22, the program waits to receive serial command data from the PC 70. As shown in the flowchart, the combination of blocks B22–B28 constitute a wait loop which is continuously executed until data is received. When data is received at the serial port of the microcontroller 15, the received data is analyzed by the program in decisional blocks B24, B26 and B28. If the data is determined in block B24 to be an erase page X command, where X may be any integer from 1 to 7, for example, then the contents of page X of the main program is erased by the instructions of block B30. When the erasure of the page contents is complete, data representative of erasure completion is sent back over the cable 20 to the PC 70 by the instructions of block B32. Thereafter, program execution is diverted back to block B22 awaiting receipt of the next data or command from the PC 70.

If the data is not an erasure command, but rather a record or load new data command, then it is identified by block B26. In the present embodiment, when new data is to be loaded into the main program of the flash memory 50, the first byte of a serial string of data bytes contains the character "S" and the second byte contains the numeral "2". Accordingly, when "S" and then "2" are identified in the first and second bytes of the byte string in decisional block B26, then a record buffer of memory 53 is cleared in block 34 and a record enable flag is set true in block B36.

With the record enable flag set true, decision block B28 diverts program execution to block B38 wherein each of the subsequent characters of the string of data words are added to the record buffer. In the present embodiment, the serially received string of data words are in a standard ASCII format wherein a byte of data comprises two ASCII character bytes. That is, the first character byte contains the first four bits of the data byte and the second character byte contains the last four bits of the data byte. For this example, each string of data comprises 128 ASCII character bytes followed by one or more bytes of check sum error code. Also, contained within the data word string is a starting address of a main program portion of the flash memory into which the data string is to be loaded. The string of data from the PC 70 continues to be received by the microcontroller 15 and added to the buffer memory until the buffer is fully loaded as determined by block B40.

Thereafter, the check sum error code of the data string is analyzed by the instructions of block B42. If it is determined in block B42 that the there is an error in transmission of the instant data stream, then a data word representing bad record data sent is transmitted back to PC 70 over the cable 20 by the instructions of block B44 and the record enable flag is set false in block B46. Program execution is then returned to block B22. If the check sum error code is determined to be correct by block B42, then in block B48 the main program section of the flash memory is loaded with the buffered string of data starting at the address specified in the data string. When the loading of data into the main program section of the flash memory is complete, data representative of programming complete is transmitted by block B50 over the serial cable 20 to the PC 70 and the record enable flag is set false in block B46.

The foregoing described process for reprogramming the main program of the flash memory 50 will continue for a multiplicity of data string transmissions from the PC 70 to the microcontroller 15 until the main program is updated or reprogramming is complete. Thereafter, the boot program will be executed starting at block B2.

While the present invention has been described herein above in connection with one or more embodiments, it is understood that such descriptions are provided merely by way of example. Accordingly, the present invention should not be limited by any of the foregoing described embodiments, but rather construed in breadth and broad scope in accordance with the recitation of the claims appended hereto.

What is claimed is:

1. Apparatus for reprogramming a programmed controller of a power driven wheelchair, said apparatus comprising:
   a reprogrammable, non-volatile memory programmed with a plurality of programs, including drive and application programs executable by said controller to operate said wheelchair, said non-volatile memory disposed at said wheelchair and coupled to said wheelchair controller;
   a general-purpose computer programmed to reprogram said non-volatile memory while disposed at said wheelchair, said programmed computer for storing replacement programs use in reprogramming said drive and application programs of the non-volatile memory;
   means for coupling said programmed computer to said wheelchair controller for accommodating an exchange of data therebetween; and
   wherein said wheelchair controller being operative to communicate with said programmed computer through said coupling means to reprogram said drive and application programs of the non-volatile memory with said replacement programs while said non-volatile memory is disposed at said wheelchair.

2. The apparatus of claim 1 wherein the non-volatile memory includes predetermined memory locations for storing coded words; and wherein the wheelchair controller is operative to execute one of the programs of the plurality of programs stored in the non-volatile memory to determine if the drive and application programs of the plurality are acceptable for execution based on said coded words stored in said predetermined memory locations.

3. The apparatus of claim 2 wherein the one program is executed by the wheelchair controller upon being powered up.

4. The apparatus of claim 3 wherein during the execution of the one program, if the drive and application programs are determined to be unacceptable for execution, the wheelchair controller is operative to enter a wait loop waiting for reprogramming data from the programmed computer.

5. The apparatus of claim 3 wherein during the execution of the one program, if the drive and application programs are determined to be acceptable, the wheelchair controller is permitted to divert program execution to the drive and application programs stored in the non-volatile memory to operate the wheelchair.

6. The apparatus of claim 1 wherein during the execution of the the drive and application programs, the wheelchair controller is operative to monitor if reprogramming data is being communicated thereto through the coupling means.

7. The apparatus of claim 1 wherein the non-volatile memory comprises a flash memory.

8. The apparatus of claim 1 wherein the general-purpose programmed computer comprises a personal computer.

9. The apparatus of claim 1 wherein the coupling means comprises a joystick unit of the wheelchair, said joystick unit being coupled to the wheelchair controller and operative to communicate therewith for operating the wheelchair.

10. The apparatus of claim 9 wherein the programmed computer is coupled to the wheelchair controller though a charger port of the joystick unit for communicating reprogramming data with the wheelchair controller bit serially from a communication port thereof.

11. The apparatus of claim 1 further comprising a joystick unit, said joystick unit being coupled to the wheelchair controller and operative to communicate therewith; and wherein the programmed computer is configured to be removably coupled to the joystick unit by the communication channel, the programmed computer thereby communicating reprogramming data with the wheelchair controller via the joystick unit.

12. Apparatus for reprogramming a programmed controller of a power driven wheelchair, said apparatus comprising:
   a reprogrammable memory including drive and application programs executable by said controller to operate said wheelchair, said memory coupled to said wheelchair controller;
   a general-purpose computer programmed to reprogram said memory, said programmed computer for storing replacement programs for use in reprogramming said drive and application programs of the memory;
   means for coupling said programmed computer to said wheelchair controller for accommodating an exchange of data therebetween; and
   wherein said wheelchair controller being operative to communicate with said programmed computer through said coupling means to reprogram said drive and application programs of the memory with said replacement programs.

13. The apparatus of claim 12 wherein the reprogrammable memory comprises a programmable system device.

14. The apparatus of claim 12 wherein the reprogrammable memory includes a first and second memory section, a boot program being stored on said first memory section and drive and application programs being stored on said second memory section.

15. The apparatus of claim 12 wherein the general purpose computer is configured to download said replacement programs from a compact disk memory or memory diskette for use in reprogramming the reprogrammable memory.

16. The apparatus of claim 12 wherein the general purpose computer is configured to download said replacement programs from an internet website for use in reprogramming the reprogrammable memory.

17. Apparatus for reprogramming a programmed controller of a power driven wheelchair, said apparatus comprising:
- a reprogrammable, non-volatile memory programmed with a plurality of programs, including drive and application programs executable by said controller to operate said wheelchair, said non-volatile memory disposed at said wheelchair and coupled to said wheelchair controller;
- a general-purpose computer programmed to reprogram said non-volatile memory while disposed at said wheelchair, said programmed computer for storing replacement programs for use in reprogramming said drive and application programs of the non-volatile memory;
- a communication channel for coupling said programmed computer to said wheelchair controller for accommodating an exchange of data therebetween; and
- wherein said wheelchair controller being operative to communicate with said programmed computer through said communication channel to reprogram said drive and application programs of the non-volatile memory with said replacement programs while said non-volatile memory is disposed at said wheelchair.

18. The apparatus of claim 17 wherein the non-volatile memory includes predetermined memory locations for storing coded words; and wherein the wheelchair controller is operative to execute one of the programs of the plurality of programs stored in the non-volatile memory to determine if the drive and application programs of the plurality are acceptable for execution based on said coded words stored in said predetermined memory locations.

19. The apparatus of claim 17 wherein during the execution of the drive and application programs, the wheelchair controller is operative to monitor if reprogramming data is being communicated thereto through the communication channel.

20. The apparatus of claim 17 wherein the non-volatile memory comprises a flash memory.

* * * * *